(12) United States Patent
Suo et al.

(10) Patent No.: US 6,485,111 B2
(45) Date of Patent: Nov. 26, 2002

(54) POWER ASSISTED BRAKING SYSTEM

(75) Inventors: Sophia P. Suo, Northville, MI (US); Kevin J. Pavlov, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/748,682

(22) Filed: Dec. 22, 2000

(65) Prior Publication Data

US 2002/0079173 A1 Jun. 27, 2002

(51) Int. Cl.$^7$ ............................. B60T 13/66; B60L 7/00
(52) U.S. Cl. ..................... 303/20; 303/186; 188/158
(58) Field of Search ........................ 303/3, 15, 139, 303/152, 155, 157, 158, 163, 186, 20; 188/156, 157, 158, 159, 161, 162

(56) References Cited

U.S. PATENT DOCUMENTS

| | | | |
|---|---|---|---|
| 4,576,417 A | | 3/1986 | Dobner |
| 4,778,223 A | * | 10/1988 | Inoue .......................... 303/152 |
| 4,848,852 A | * | 7/1989 | Inoue et al. ................. 303/155 |
| 5,294,190 A | | 3/1994 | Feldmann et al. |
| 5,294,191 A | | 3/1994 | Giorgetti et al. |
| 5,303,986 A | * | 4/1994 | VanDeMotter et al. ........ 303/3 |
| 5,332,298 A | | 7/1994 | Fujioka |
| 5,400,251 A | * | 3/1995 | Ishiguro et al. ................. 303/3 |
| 5,423,600 A | | 6/1995 | Riddiford et al. |
| 5,573,312 A | | 11/1996 | Müller et al. |
| 5,618,084 A | * | 4/1997 | Reiner ............................ 303/3 |
| 5,743,599 A | * | 4/1998 | Henderson et al. ......... 303/152 |
| 5,762,407 A | | 6/1998 | Stacey et al. |
| 5,823,636 A | | 10/1998 | Parker et al. |
| 5,952,799 A | | 9/1999 | Maisch et al. |
| 6,062,658 A | | 5/2000 | Stumpe et al. |

FOREIGN PATENT DOCUMENTS

| | | |
|---|---|---|
| DE | 33 08 477 A1 * | 9/1984 |
| DE | 43 42 738 A1 * | 6/1995 |
| JP | 5-137207 A * | 6/1993 |
| JP | 6-113407 A * | 4/1994 |
| JP | 8-296537 A * | 11/1996 |

* cited by examiner

*Primary Examiner*—Jack Lavinder
*Assistant Examiner*—Thomas J. Williams
(74) *Attorney, Agent, or Firm*—John E. Kajander, Esq.

(57) ABSTRACT

A method of controlling a retarder brake system of a vehicle. The method comprises the steps of determining an operator braking input indicative of a desired vehicle deceleration and generating a desired retarder torque value (DT) corresponding to the desired vehicle deceleration value. The method further includes determining a wheel speed value for each wheel of the vehicle and generating a front-to-rear wheel slip (FRS) value indicative of rear wheel lockup as a function of the wheel speed values. A retarder torque reduction (TR) value is also generated as a function of the FRS value. A desired retarder torque command (TC) is then generated as a function of the DT and TR values. The method also includes the step of controlling the retarder as a function of the retarder torque command to achieve the desired vehicle deceleration. Thus, the TR value reduced the retarding torque which would otherwise be applied in response to the driver input, to prevent driven wheel lockup.

16 Claims, 3 Drawing Sheets

POWER ASSISTED BRAKING SYSTEM

BACKGROUND

The invention relates generally to power assisted braking systems for vehicles and more particularly, concerns a method and apparatus for controlling the brake system of a vehicle having frictional duty brakes and an electrically controlled driveline retarder brake adjusted as a function of the driver's braking command.

Conventional retarder brake systems, also known as eddy current braking systems, comprise a portion (stator) that is fixed to the chassis of the vehicle and that includes inductor windings, and a moving portion (rotor) including an armature, which is coupled to a rotary element of the vehicle, generally the transmission shaft. The armature is typically a body of ferro-magnetic material which, when moving relative to excited windings has electrical currents known as "eddy" currents induced therein. Because the resistivity of the armature, these eddy currents cause energy to be dissipated, resulting in the rotor, and thus the vehicle driveshaft, being slowed down. The energy is dissipated typically in the form of heat, and the rotor is commonly given a finned configuration suitable for disposing of the heat.

Most retarder brake systems are manually operated wherein the driver of the vehicle can actuate a multi-position control lever to obtain a braking effect on the vehicle with a torque that varies depending on the position selected for the lever. This variability is obtained by a set of relays each serving to excite one of the windings, with the number of relays in the closed-circuit position depending on the position of the lever. Thus, the driveline mounted retarder brake assists the existing frictional brake system in the braking the vehicle.

Most retarder brake systems are manually operated. Thus, there exists a need for an automated control method for actuating a vehicle driveline retarder to improve vehicle braking performance.

SUMMARY OF THE INVENTION

It is therefore an object of the present invention to provide a control method for a vehicle electrical power assisted brake system which includes a driveline mounted retarder brake and frictional duty brake system.

According to the present invention, the foregoing and other objects are attained by a method of controlling a retarder brake system of a vehicle. The method comprises the steps of determining an operator braking input indicative of a desired vehicle deceleration and generating a desired retarder torque value (DT) corresponding to the desired vehicle deceleration value. The method further includes determining a wheel speed value for each wheel of the vehicle and generating a front-to-rear wheel slip (FRS) value indicative of rear wheel lockup as a function of the wheel speed values. A retarder torque reduction (TR) value is also generated as a function of the FRS value. A desired retarder torque command (TC) is then generated as a function of the DT and TR values. The method also includes the step of controlling the retarder as a function of the retarder torque command to achieve the desired vehicle deceleration. Thus, the TR value reduced the retarding torque which would otherwise be applied in response to the driver input, to prevent driven wheel lockup.

In another aspect of the present invention, the driver braking input includes a selectable vehicle braking characteristic in addition to the brake pedal input. Thus, for a given amount of brake pedal treadle, the operator can select the vehicle braking response by increasing or decreasing the retarder brake activation. In another aspect of the invention, the vehicle braking characteristic is nonlinear wherein, for increasing brake pedal treadle, the retarder brake provide increasing brake torque to the vehicle driveshaft. In this way, the vehicle operator can control the braking feel of the vehicle by overning the retarder brake actuation in response to brake pedal treadle. Further aspects of the present method incorporate traction control and activation of a limited slip differential.

An advantage of the present invention is that it extends the life of the frictional duty brakes by providing additional braking force via the retarder brake. Another advantage is improved brake pedal effort in that high braking torque at the wheels is achieved without requiring high pedal force and long pedal travel from the vehicle operator. Another advantage of the present invention is improved deceleration perception in that the retarder brake generates braking force at the rear wheels quicker than the frictional duty brake system thereby decelerating the vehicle with minimum pitch.

Another advantage of the present invention is an improved anti-lock brake strategy in that the brake retarder can be used to reduce braking torque when rear wheel lockup appears imminent. Other objects and advantages of the invention will become apparent upon reading the following detailed description of and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

In the drawings.

DESCRIPTION OF THE INVENTION

Figure 1:
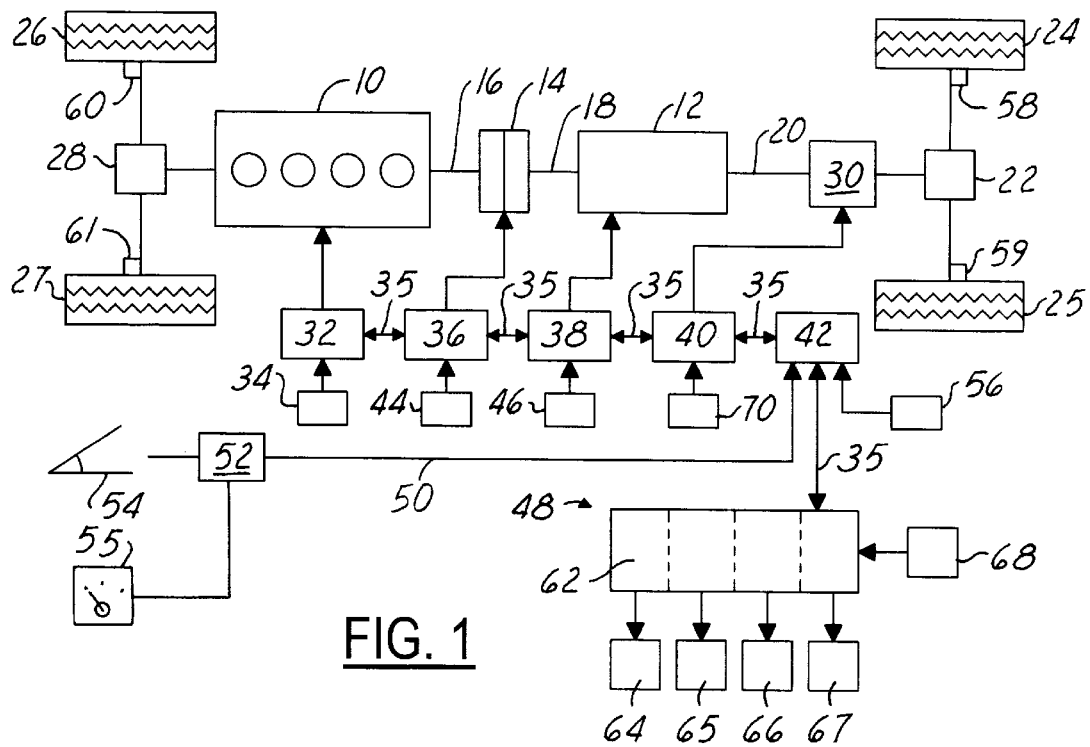
FIG. 1 is a schematic diagram of a vehicle driveline including an electrical power assisted brake system in which the present invention may be used to advantage.

Referring now to FIG. 1, there is shown a schematic block diagram of a vehicle driveline and electrical power assisted brake system in which the present invention may be used to advantage. The vehicle drivetrain system includes a fuel controlled engine 10, such as a gasoline engine or the like, which is drivingly connected to a transmission 12 by way of a selectively engagable and disengagable coupling 14 such a master clutch or the like. The engine 10 includes a output shaft or crankshaft 16 which may be selectively drivingly engaged and disengaged from the transmission input shaft 18 by way of the coupling 14. The transmission input shaft 18 is selectively drivingly coupled to the transmission output shaft 20 by way of transmission gears, shafts, and clutches, as is well-known in the art. The transmission output shaft 20 is coupled to the vehicle final drive assembly 22 such as a rear drive axle or a transfer case for providing driving torque to the rear drive wheel 24, 25. Final drive assembly 22 is preferably a semi-active differential such as a side/side torque-biasing unit for improved vehicle stability. The vehicle driveline further includes front wheels 26, 27 which are preferably non-driven. Front drive wheels 26, 27 are controlled by the front drive assembly 28 which includes steering components such as front steer axles.

The vehicle powertrain additionally includes a driveline retarder 30 for applying a retarding torque to the vehicle drive wheels 24, 25 by retarding the rotation of the transmission output shaft 20. The retarder 30 is a conventional, electrically-controlled retarder which includes a series of windings.

The vehicle powertrain system includes one or more electronic control units which preferably are microprocessor-based and include an input bus for receiving input signals and for processing the same according to predetermined logic rules to issue command output signals along an output bus to various system actuators. Thus, the engine control unit 32 receives input signals from sensors 34 representing, for example, a throttle position signal from a throttle position sensor, an engine speed signal, an input shaft speed signal, an output shaft speed signal; and controls outputs such as the fueling rate and spark timing to achieve the desired engine output. The engine controller 32 communicates with other system controllers along a communication bus 35 (such as a CAN bus system). Such other controllers may include a clutch controller 36, a transmission controller 38, the retarder brake controller 40, and a frictional duty brake controller 42. The clutch controller 36 receives inputs from sensors 44 indicating, for example, the respective speeds of the crankshaft 16 and transmission input shaft 18, among other things. The transmission controller 38 likewise receives inputs from sensors 46 which may include the speeds of the respective transmission input and output shafts 18, 20, and outputs control signals to operate the transmission 12 in accordance with known methods.

The brake retarder 30 preferably is capable of operating at one or more levels of retardation ranging from an inactive state where little or no retarding torque is applied to the driveline, progressively to a maximum state of applying retarding torque to the driveline. Alternatively, the retarder brake may be capable of providing a continuously variable level of retarding torque.

The electronic power assisted brake control system includes the retarder brake 30 and associated controller 40. The frictional duty brake system 48 includes the frictional duty brake controller 42. Actuation signals are sent to both controllers 40, 42 over an input line 50 from brake pedal sensors 52 which detect actuation of the brake pedal 54 to indicate the brake pedal force and brake pedal travel. Operating variables of the electronic power assisted brake system or of the vehicle are sent to the brake controllers 40, 42 from measuring devices 56 which indicate, for example, one or more axle load signals, vehicle velocity signals, wheel speed signals from wheel speed sensors 58, 59, 60, 61, etc. The controller 42 is connected by a communications link such as a CAN bus to one or more controller units 62 for controlling the frictional duty brakes 64, 65, 66, 67 associated with respective wheels 24, 25, 26, 27. Operating variables of the brakes such as wheel speed values, brake lining wear values, etc. are sent to the control unit 62 from measuring devices 68. The control unit 42 is also connected by a communications ink which can also be part of the CAN bus system of the vehicle, to the retarder brake controller 40 for controlling the brake retarder 30. The operating variables required for the brake retarder control are sent as input signals to the brake retarder controller 40 from sensors or measuring devices 70. Operating variables for the retarder may include the retarder temperature, the rotational speed of the retarder, pressure signals in the case of a hydrodynamic retarder, the current flow through the excited windings in the case of an eddy current brake retarder, etc.

Although the drivetrain controllers 32, 36, 38 and their respective sensory inputs 34, 44, 46 are shown separately, it is to be understood that the driveline configuration of FIG. 1 is merely exemplary of one type of driveline in which the present retarder brake control method may be used. Accordingly, one or more of the control units 32, 36, 38 as well as control units 40, 42, and 62 could be combined in a single controller. In addition, although the vehicle driveline shown in FIG. 1 is a rear drive arrangement, the present control scheme described below could also apply to all-wheel drive or four-wheel drive vehicle systems.

Figure 2:
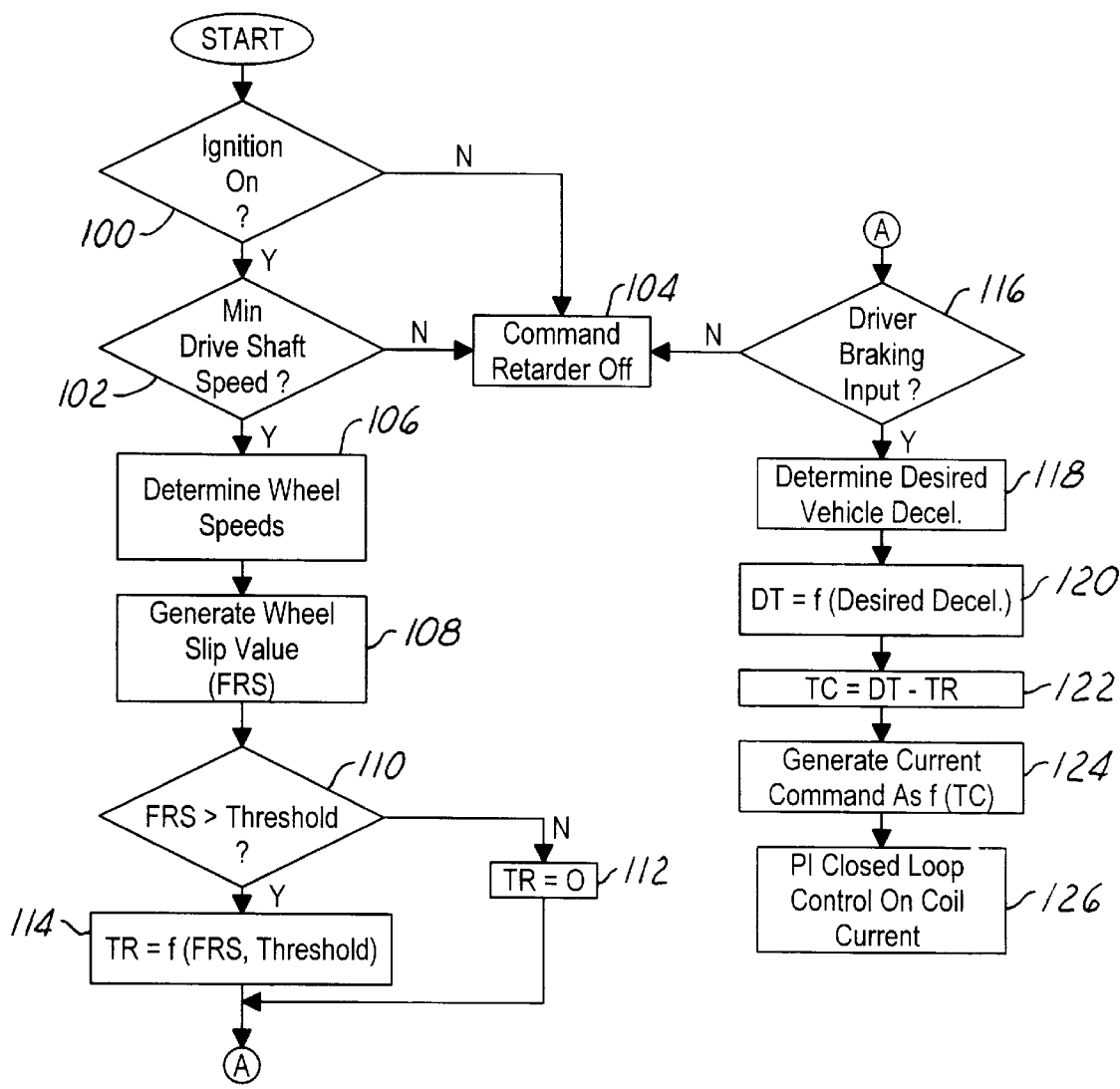
FIG. 2 is a logic flow diagram of one embodiment of the control method of the present invention for use with an electrical power assisted brake system.

Referring now to FIG. 2, there is shown a logic flow diagram of one method of controlling the electrical power assisted braking system of FIG. 1. The logic begins in step 100 with initialization procedures such as determining whether the actuator system has power by checking the ignition-on status, and in step 102, determining whether the driveshaft speed has reached at least a minimum driveshaft speed before the retarder brake can be engaged. If neither of these tests are met, the retarder brake is commanded to an off state in step 104. The logic then continues to step 106 wherein the speeds of all four vehicle wheels is determined. This information is then used in step 108 to generate a front-to-rear slip value (FRS) which is defined as the difference between the higher front wheel speed and the lower rear wheel speed. The FRS value is indicative of rear wheel lockup.

The front to rear slip value is then compared to an allowable threshold value in step 110. If the threshold is not exceeded in logic block 112, it indicates that wheel lockup is not imminent and, therefore, the amount of torque reduction (TR) is set equal to zero. Otherwise, if the threshold is exceeded in step 110, the amount of torque reduction is determined as a function of the difference between the front to rear slip value and the allowable threshold value in block 114. In other words, the mount of commanded driveline retarding torque desired by the operation input will be reduced by the torque reduction (TR) amount to prevent rear wheel lockup.

Once the front-to-rear slip analysis has been performed and the desired torque reduction for the retarder brake generated, the logic continues to step 116 to determine whether there is any operating braking input. This is determined with reference to the brake pedal force and brake pedal travel as determined by the brake pedal sensors, or a manually operated lever or joystick position corresponding to a desired amount of driveline retarding torque. If no driver braking input is detected, the retarder brake is commanded off in block 104. Otherwise, the desired vehicle deceleration is determined in block 118 based on the driver inputs. In block 120, the desired retarding torque (DT) is calculated as a function of the desired vehicle deceleration value determined in block 118. This is accomplished preferably with a lookup table of values indexed by the driver brake input to generate a desired vehicle deceleration. The desired retarding torque is then generated as a function of desired vehicle deceleration.

By indexing the desired vehicle deceleration by the driver braking input to generate the desired retarding torque (DT), the present control method contemplates "tunable" braking systems. Thus, the operator could select the slope of the deceleration characteristic.

Referring again to FIG. 1, there is shown a user-selectable switch 55 indicating the desired braking system characteristic. By selecting a "firm" mode, the system can generate a significant amount of vehicle deceleration via retarder actuation for a relatively low brake force input. The "normal" mode would provide slightly less retarding effort for the same braking input. Finally, a "soft" mode may only generate minimal retarder actuation for the same level of brake input. In this way, the braking effect experienced by the operator can be tuned to effectuate the desired braking "feel". Similarly, the calibration tables can be nonlinear. In such cases, the braking effect induced by retarder actuation can be progressively greater for incremental increases in brake pedal force input by the operator.

In block 122, an overall torque command for the retarder brake is generated as the desired retarding torque (DT) corresponding to the operator input less the amount of torque reduction (TR) determined in step 112 or 114 necessary to prevent rear wheel lockup or excessive rear wheel braking. In block 124, the torque command is converted into a current command for the power driver for the electrical actuators governing the retarder brake. The resulting current command is then closed-loop controlled in block 126 to achieve the desired retarder brake operation. Preferably, the controller in block 126 is a proportional integral (PI) controller.

Figure 3:
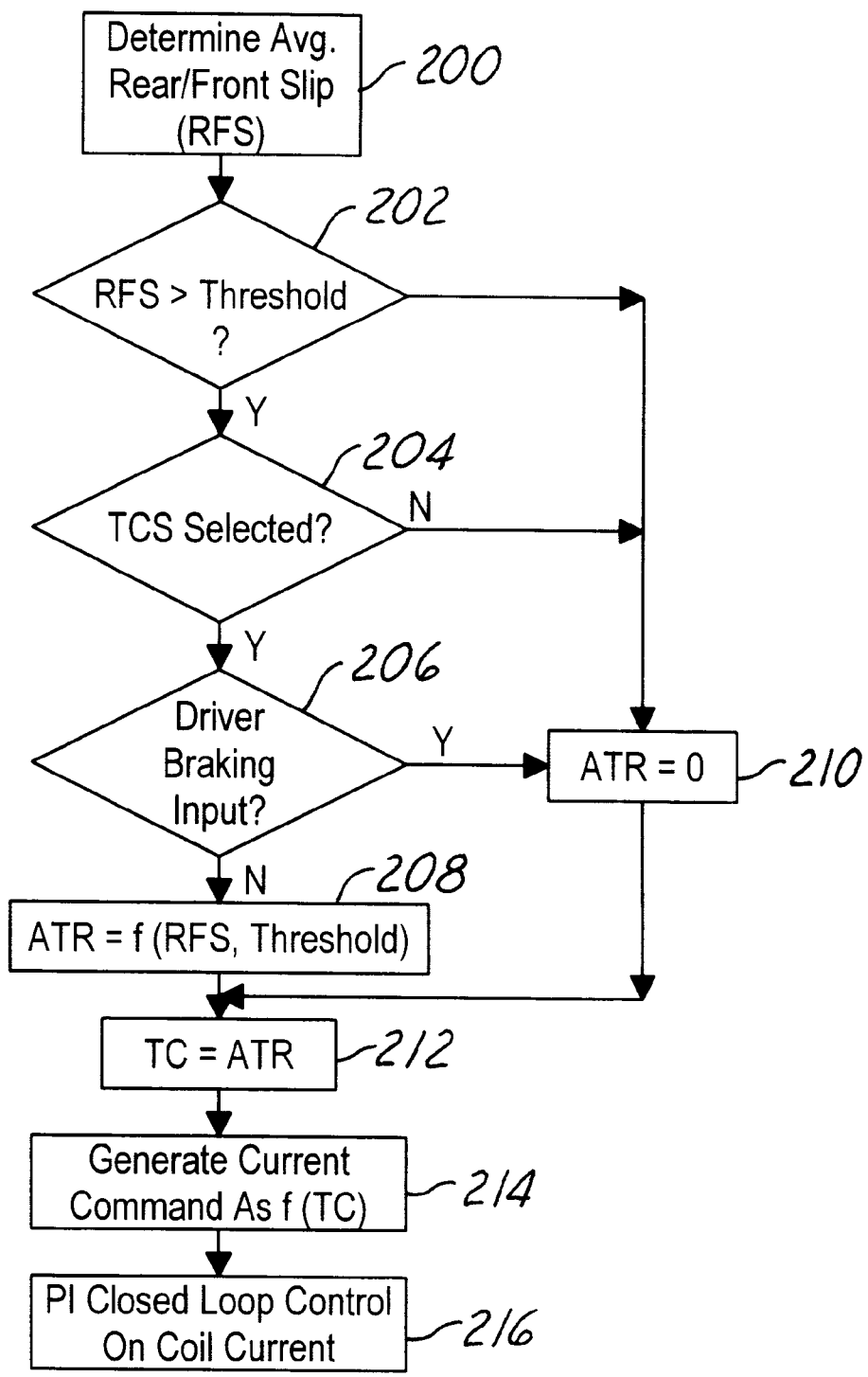
FIG. 3 is a logic flow diagram of another aspect of the control method of FIG. 2.

Referring now to FIG. 3, there is shown a logic flow diagram of another aspect of the control scheme of FIG. 2. The logic control scheme of FIG. 3 adds a traction control feature to the logic routine of FIG. 2. The logic begins in step 200 by determining the average rear-to-front wheel slip value (RFS) as determined from the wheel speed sensor inputs. If the RFS value exceeds a desired threshold value in step 202 and the traction control system is activated in step 204 and there is no operator braking input as determined from the brake pedal sensors in step 206, an amount of torque request (ATR) value is generated in block 208 as a function of the difference between the RFS value and the desired threshold. This value represents the amount of retarder torque necessary to prevent the rear (driven) wheels from slipping. This is preferably a proportional-integral function related to the amount of slip in excess of the threshold slip value. If no slip is detected, in block 210, the ATR value is set equal to zero. Additionally, the drive throttle input can be monitored to insure that traction control activation is proper. Thus, if there is no throttle activation, ATR would also be set to zero.

In block 212, the torque command is set equal to the ATR value determined in step 208. The torque command is then converted into a current command for the power driver of the retarder brake actuator in step 214. The current command is derived from a lookup table of values indexed by torque command and driveshaft speed. In step 216, the coil current command is closed-loop controlled to achieve the desired retarder brake actuation. In this way, the logic routine of FIG. 3 provides the additional advantage of incorporating traction control into the controller scheme of FIG. 2.

Figure 4:
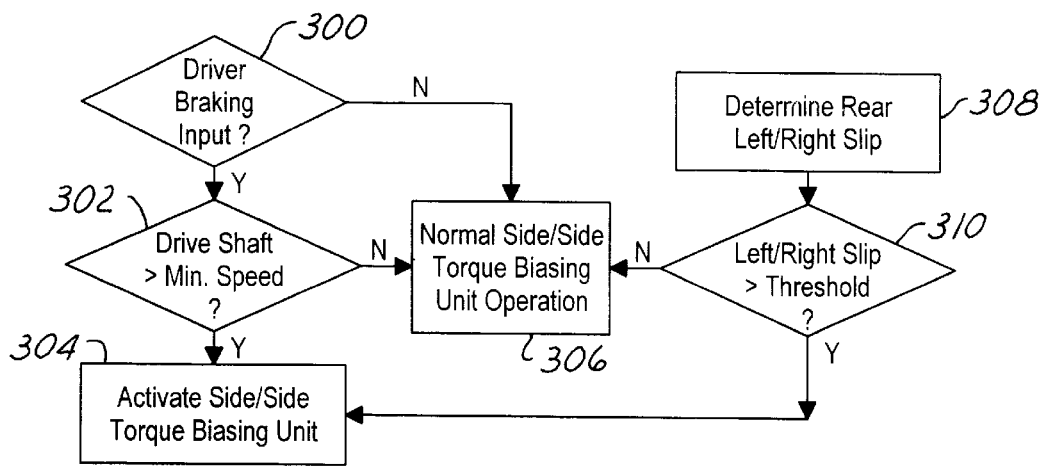
FIG. 4 is a logic flow diagram of another aspect of the control method of FIG. 2.

Referring now to FIG. 4, there is shown a logic flow diagram of another aspect of the control scheme of FIG. 2. The logic routine of FIG. 4 incorporates control of the side/side torque biasing unit 22 (FIG. 1), i.e., the limited slip differential, into the retarder brake control scheme.

Upon detection of driver braking input in step 300, and when the driveshaft exceeds the minimum speed necessary for retarder actuation in step 302, the side/side torque biasing unit is activated to synchronize the rotation of the drive wheels in step 304. In this way, actuation of the retarder brake to the input shaft of the rear drive assembly uniformly brakes the rear drive wheels. Otherwise, in step 306, the rear drive assembly operates normally.

Similarly, upon detection of rear right/left wheel slip in step 308 which exceeds a desired amount (step 310), the side/side torque biasing unit is activated to reduce the slip by any known method.

Accordingly, by including the control features of FIGS. 3 and 4 into the control scheme of FIG. 2, the present method provides a completely integrated frictional and retarder brake system including anti-lock braking, traction control and limited slip differential drive.

From the foregoing, it can be seen that there has been brought to the art a new and improved retarder brake control method. While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

1. A method of controlling a driveline retarder brake system of a vehicle comprising the steps of:

determining an operator braking input indicative of a desired vehicle deceleration, said step of determining including the step of determining a brake mode value selected from at least a first and second mode wherein said first mode corresponds to a higher desired vehicle deceleration rate for a given brake pedal treadle than said second mode;

generating a desired retarder torque value (DT) corresponding to said desired vehicle deceleration value;

determining a wheel speed value for each wheel of said vehicle;

generating a front-to-rear wheel slip (FRS) value indicative of rear wheel lockup as a function of said wheel speed values;

generating a retarder torque reduction (TR) value as a function of said FRS value;

generating a desired retarder torque command (TC) corresponding to said desired vehicle deceleration value and said retarder torque reduction value; and controlling said retarder as a function of said retarder torque value to achieve said desired vehicle deceleration.

2. The method of claim 1 wherein the step of generating a retarder torque reduction (TR) value as a function of said FRS value includes the step of comparing said FRS value to a threshold value and, when said FRS value exceeds said threshold value, generating a retarder torque reduction (TR) value as a function of said FRS value.

3. The method of claim 1 wherein the step of generating a desired retarder torque value (DT) includes the step of generating a desired retarder torque value from a table of values linearly indexed by said operator braking input.

4. A method of controlling a retarder brake system of a vehicle comprising the steps of:

determining an operator braking input indicative of a desired vehicle deceleration, said step of determining including the step of determining a brake mode value selected from at least a first and second mode wherein said first mode corresponds to a higher desired vehicle deceleration rate for a given brake pedal treadle than said second mode;

generating a desired retarder torque value (DT) corresponding to said desired vehicle deceleration value;

determining a wheel speed value for each wheel of said vehicle;

detecting a brake pedal treadle value indicative of whether an operator has depressed the vehicle brake pedal;

generating a rear-to-front wheel slip (RFS) value indicative of rear wheel spin as a function of said wheel speed values;

generating a retarder torque (ATR) value as a function of said RFS value;

generating a desired retarder torque command (TC) corresponding to said retarder torque value when said brake pedal treadle value is zero; and controlling said retarder as a function of said retarder torque value to achieve said desired vehicle deceleration.

5. The method of claim 4 wherein the step of generating said retarder torque (ATR) value as a function of said RFS value includes the step of comparing said RFS value to a threshold value and, when said RFS value exceeds said threshold value, generating said retarder torque (ATR) value as a function of said RFS value.

6. The method of claim 4 further comprising the step of activating a limited slip differential associated with the driven wheels of said vehicle in response to said operator braking input.

7. A method of controlling a driveline retarder brake system of a vehicle comprising the steps of:

determining an operator braking input indicative of a desired vehicle deceleration;

generating a desired retarder torque value (DT) corresponding to said desired vehicle deceleration value;

determining a wheel speed value for each wheel of said vehicle;

generating a front-to-rear wheel slip (FRS) value indicative of rear wheel lockup as a function of said wheel speed values;

generating a retarder torque reduction (TR) value as a function of said FRS value;

generating a desired retarder torque command (TC) as a function of said DT and TR values; and controlling said retarder as a function of said retarder torque command to achieve said desired vehicle deceleration.

8. The method of claim 7 wherein the step of controlling said retarder includes the steps of:

generating a retarder winding current value as a function of said retarder torque command; and controlling the retarder winding current as a function of said retarder winding current value.

9. The method of claim 7 wherein the step of generating a retarder torque reduction (TR) value as a function of said FRS value includes the step of comparing said FRS value to a threshold value and, when said FRS value exceeds said threshold value, generating a retarder torque reduction (TR) value as a function of said FRS value.

10. The method of claim 7 further comprising the steps of:

detecting a brake pedal treadle value indicative of whether an operator has depressed the vehicle brake pedal;

generating a rear-to-front wheel slip (RFS) value indicative of rear wheel spin as a function of said wheel speed values;

generating a retarder torque (ATR) value as a function of said RFS value; and generating a desired retarder torque command (TC) corresponding to said retarder torque value when said brake pedal treadle value is zero.

11. The method of claim 10 wherein the step of generating said retarder torque (ATR) value as a function of said RFS value includes the step of comparing said RFS value to a threshold value and, when said RFS value exceeds said threshold value, generating said retarder torque (ATR) value as a function of said RFS value.

12. The method of claim 7 further comprising the step of activating a limited slip differential associated with the driven wheels of said vehicle in response to said operator braking input.

13. The method of claim 7 wherein the step of determining an operator braking input includes the step of measuring an operator brake pedal travel value.

14. The method of claim 7 wherein the step of determining an operator braking input includes the step of measuring an operator brake pedal force value.

15. A method of controlling a driveline retarder brake system of a vehicle comprising the steps of:

determining a wheel speed value for each wheel of said vehicle;

detecting a brake pedal treadle value indicative of whether an operator has depressed the vehicle brake pedal;

generating a rear-to-front wheel slip (RFS) value indicative of rear wheel spin as a function of said wheel speed values;

generating a retarder torque (ATR) value as a function of said RFS value;

generating a desired retarder torque command (TC) corresponding to said ATR value when said brake pedal treadle value is zero; and controlling said retarder as a function of said retarder torque command to achieve said desired vehicle deceleration.

16. The method of claim 15 wherein the step of generating said retarder torque (ATR) value as a function of said RFS value includes the step of comparing said RFS value to a threshold value and, when said RFS value exceeds said threshold value, generating said retarder torque (ATR) value as a function of said RFS value.

* * * * *